July 27, 1954

C. R. DITCHFIELD 2,685,028

HOLDER OR MOUNTING FOR CIRCUIT COMPONENTS
IN WAVE GUIDE STRUCTURES

Filed Dec. 4, 1950

Inventor
Charles Robinson Ditchfield

By
Stevens, Davis, Miller + Mosher
his Attorneys

Patented July 27, 1954

2,685,028

UNITED STATES PATENT OFFICE 2,685,028

HOLDER OR MOUNTING FOR CIRCUIT COMPONENTS IN WAVE GUIDE STRUCTURES

Charles Robinson Ditchfield, Great Malvern, England, assignor to National Research Development Corporation, London, England, a British corporation Application December 4, 1950, Serial No. 198,940

Claims priority, application Great Britain December 6, 1949

5 Claims. (Cl. 250—31)

Figure 1:
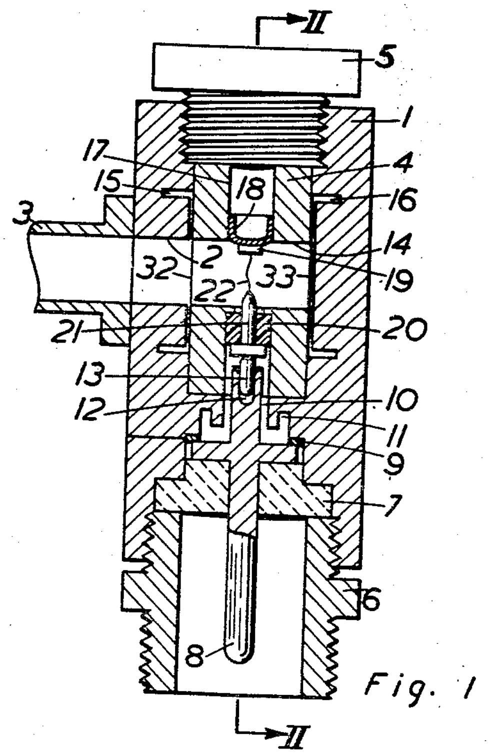

The present invention relates to structures for mounting circuit components such as crystal rectifiers, bolometers or like devices in waveguides for UHF electromagnetic waves.

In the construction of certain devices such as crystal mixer units, detector units and the like, it is sometimes required to expose a crystal rectifier, comprising a "cat's whisker" in contact with a crystal element, or a thermistor bead or like device directly to the electromagnetic energy in a waveguide. Devices of this nature are known in which the crystal detector or other device is mounted in a unit forming a section of coaxial transmission line which may be mounted in a coaxial line branched off from the waveguide and fed from a probe extending across the waveguide. Such a device becomes expensive to manufacture when the wavelength at which it is required to work falls below a certain figure in the region of 1 cm. in view of the precision with which the parts thereof must be made in order that the coupling impedance involved may be properly matched. The shorter the wavelength becomes the more difficult such a device is to manufacture and consequently the more expensive it is to produce. An alternative form comprises a capsule having a ceramic body in which the crystal detector is mounted the capsule being arranged to plug into a suitable socket so as to bridge the waveguide. This form of device again becomes impossible at the shorter wave lengths in view not only of the impedance matching difficulties but also because of the glossy nature of the ceramic body.

In yet another arrangement it is known to build the crystal rectifier into a short length of waveguide as an integral part thereof so that the device as a whole may be coupled to an existing waveguide by means of a flange coupling of well known form. This type of device besides being expensive to manufacture, has the disadvantage that should the crystal rectifier contact burn out the whole device must be wasted. In any of these arrangements above referred to, therefore, failure of the rectifier portion of the device involves wastage of a structure difficult and expensive to manufacture.

The present invention has for one of its objects to provide an arrangement particularly suitable for mounting crystal rectifier units in operative relation to a waveguide and in which the crystal rectifier contact is carried in a sub-structure relatively simple to manufacture for even the shortest wavelengths at present employed and correspondingly relatively cheap to produce whereby replacement of such a substructure which has failed may be made simply and at relatively small cost.

Another object of the invention is to provide an arrangement of the kind described, in which the frequency sensitivity of the device is less than in some of the known types of device of this nature.

According to this invention a holder or mounting for a waveguide circuit component such as a crystal rectifier comprises a shell having a wall aperture through which coupling may be effected to a waveguide and an insert carrying the circuit component adapted to be inserted in said shell, wherein said insert comprises an aperture arranged to register with the wall aperture of said shell when in position therein to form a continuation of said waveguide through said insert, means being provided for causing the gap between said wall aperture and the aperture through said insert to present low impedance to the transfer of energy from said waveguide to the aperture through said insert. The circuit component carried by the insert may be mounted so as to span the aperture through the insert. Means provided on the insert afford connection between the circuit component and external circuit coupling means provided on the shell when the insert is placed in its proper position in the shell.

According to the features of the invention, the aperture through the insert may be closed by non-conducting windows and the aperture through said insert may be caused to couple, on the side thereof remote from that which couples to the wall aperture of the shell either to a further wall aperture formed in the shell or to a short-circuit termination formed by a wall of the shell.

Figure 2:
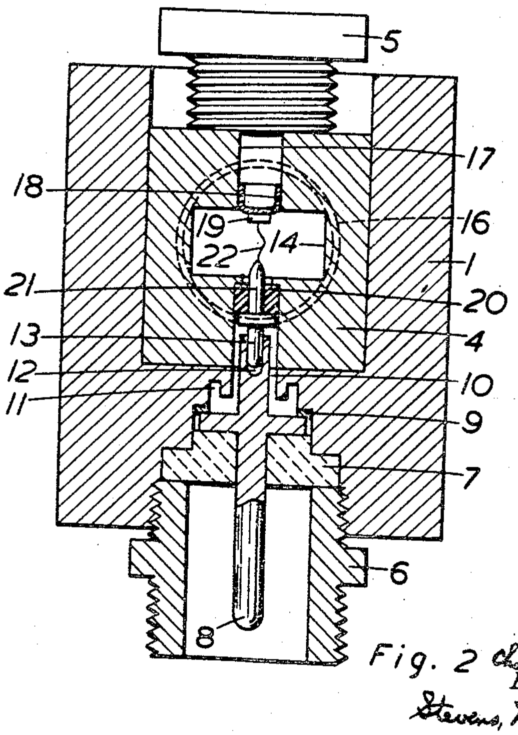

In order that the invention may be more clearly understood and readily carried into effect an embodiment thereof will now be described with reference to the accompanying drawing in which:

Fig. 1 is a cross sectional view of a holder containing an insert carrying a crystal rectifier unit illustrating the invention, and Fig. 2 is a further cross sectional view of the device shown in Fig. 1 taken on the line II—II of Fig. 1.

Referring now to the drawings the arrangement shown comprises a body portion 1, in one wall of which is an aperture 2, to which is coupled a waveguide 3 of rectangular cross section through which UHF energy is to be supplied to the device. The body portion 1 has a rectangular central cavity adapted to receive the insert 4 carrying the crystal rectifier to be described in more detail below. The central cavity of the body portion is open to the exterior at the top to admit the insert 4 and provision is made for a screw-in metal plug 5 to be inserted in this opening for enabling the insert 4 to be clamped into place.

At the bottom of the body portion 1 there is provided a socket member 6 screwed into the body portion to clamp in place an insulating bush 7 through which passes a central pin 8 provided with a flange which locates this pin axially and which seats upon an insulating washer 9 which in turn is seated upon a shoulder formed in the body 1 at the base of the aperture into which this structure is fitted.

The upper end of pin 8 projects through a hole 10 formed in the body 1, of larger diameter than the pin 8 so as to provide clearance, and up into the central cavity of body 1. Surrounding the hole 10 and concentric therewith is a groove 11 the depth of which is chosen to be approximately ¼ wavelength at the UHF frequency at which the device is to be used to form in known manner a choke opposing the flow of UHF energy down the transmission line formed by the pin 8 and the surrounding metal body. At its upper end the pin 8 is provided with a socket 12 adapted to receive and connect to a pin 13 provided on the insert in which the crystal detector proper is mounted.

The crystal holder insert 4 is in the form of a rectangular block snugly fitting the central aperture provided in the body portion 1. Through the block forming insert 4 there is provided an aperture 14 accurately dimensioned to support the wave carried by waveguide 3 and this aperture is arranged to lie opposite the end of the waveguide 3 when in position so as to form in effect a continuation of the waveguide. The necessity for good electrical contact between the insert 4 and the walls of the cavity in body 1 is removed by the provision on the inner surface of the wall surrounding the aperture 2 of a groove 15 of approximately ¼ wavelength in depth and suitably positioned in relation to the wavelength aperture 2 to form in well known manner a choke operative to prevent leakage of UHF energy between the wall of the body 1 and the block forming insert 4. In other words there is produced at the surface of the waveguide aperture 2 a low impedance path for the UHF energy between the body portion 1 and the insert 4. In well known manner the operation of this structure is improved by slightly recessing the surface of the wall within the groove 15 so as to form a definite space between this wall and the surface of the insert.

The same technique is applied to the wall of body 1 on the opposite side of the insert 4, the groove 16 surrounding the region of the wall of body 1 opposite the end of aperture 14 through insert 4. The surface of the wall within the groove 16 is in similar manner slightly recessed.

The insert 4 is provided with a hole 17 extending through between its upper surface and the upper wall of the waveguide aperture formed through the block 4 and in this hole there is mounted a carrier 18 on which is mounted the crystal 19. Through the opposite wall of the block 4 is formed a similar hole in which is mounted an insulating block 20 carrying a holder 21 for the "cat's whisker" 22 which extends across the waveguide aperture 14 into contact with the crystal 19. The holder 21 is formed, as shown, integrally with the pin 13 already referred to so that with the insert mounted in position electrical contact is obtained from the crystal mounted on one wall of the waveguide aperture through the "cat's whisker" contact and "cat's whisker" to holder 21, pin 13 and thus to pin 8. The end of the holder 21 which enters the waveguide may be suitably shaped and may protrude into the waveguide to the appropriate extent so that the impedance discontinuity presented by the arrangement is reduced as far as possible. The aperture 14 through the insert 4 may be closed against the ingress of dust or moisture by means of thin dielectric windows 32, 33 shown only as single lines in view of the thinness contemplated for these windows.

The operation of the device will be apparent to those skilled in the art. The dimensions of the device being suitably chosen, the crystal rectifier contact will be positioned automatically at the appropriate distance from the blank wall of body 1 which forms a short circuit termination for the waveguide. UHF energy arriving down the waveguide 3 will thus be rectified and a direct current output may be derived from the coaxial connector formed by socket 6 with its central pin 8. If the device is to be used as a mixer, energy at the signal frequency and at the local oscillator frequency will both be introduced into the waveguide 3 and intermediate frequency energy can be withdrawn through the coaxial connector 6, 8.

It will be apparent that in place of the crystal rectifier formed by "cat's whisker" 22 and crystal 19 any other devices such as a bolometer or thermistor bead may be mounted in the insert. It will also be apparent that in place of a blank wall provided in the body portion 1 opposite the waveguide aperture 2 a second waveguide aperture may be provided whereby a second waveguide input may be connected to the device or alternatively the short length of waveguide beyond the crystal rectifier may be made adjustable.

The device according to the invention requires replacement only of the insert 4 in the event of a failure in the crystal rectifier, or if the crystal rectifier is to be replaced by any other device such as a bolometer as above referred to. It should be noted also that the insert 4 although small and delicate does not require to be made with the same precision as, for example, the coaxial type of crystal detector discussed in the opening paragraphs above since the coaxial connector formed by pin 13 is required to carry only direct current or I. F. signals. Its impedance at the UHF wavelength is not therefore as critical as in the case of the coaxial crystal detector above described in which all the UHF energy to be rectified passes down the coaxial line. Suitable construction of the insert 4 and the body in which it is mounted may, moreover, enable the insert to be reversible, i. e. it may be arranged so as to operate satisfactorily with either the crystal or the "cat's whisker" connected to the D. C. or I. F. output channel. This may be achieved by arranging for the crystal holder to be insulated from the insert 4, and connected instead to a pin similar to the pin 13. Whichever way round the insert 4 is placed, either the pin 13 or its counterpart connected to the crystal will then connect to the pin 8. The plug or other cover provided for holding the insert in place may then be arranged to contact whichever pin is presented to it so as to provide a short-circuit to the body of the device at a suitable distance (usually $\lambda/2$ at the operative wavelength) from the waveguide wall to have the same effect as a short circuit at the waveguide wall itself.

The nature of the device according to the invention provides a still further advantage, namely that adjustment of the crystal contact or replacement of the crystal holder insert does not affect the distance of the crystal contact from the short circuited end of the waveguide so that this distance, being once optimised requires no further adjustment.

Other modifications will occur to those skilled in the art.

I claim:

1. Mounting for a waveguide circuit component comprising a unitary shell formed with a wall aperture coupling to a waveguide, a removable insert housed within said shell and formed with an aperture registering with the wall aperture of said shell to form a continuation of said waveguide, choke means surrounding the wall aperture in said shell for causing the gap between said shell and said insert at the region bounding their respective apertures to present low impedance to the transfer of energy from said waveguide to the aperture through said insert and a contact rectifier spanning the aperture through said insert, said contact rectifier comprising a crystal mounted in one wall of said aperture and a co-operating contact wire extending from the opposite wall of said aperture across said aperture into contact with said crystal, circuit coupling means mounted through the wall of said shell but insulated therefrom affording connection for an external circuit, coupling means mounted in the wall of said insert and insulated therefrom, carrying at one end said contact wire and mating at its other end with the coupling means mounted in the wall of said shell.

2. Mounting for a crystal rectifier in a waveguide comprising a unitary housing having an internal cavity, one wall of said housing defining an aperture affording communication between a waveguide coupled to said housing and the cavity within said housing, the internal surface of said wall having a recessed region surrounding said aperture and being grooved around said recessed region to form a resonant choke surrounding said aperture, the internal surface of the wall of said housing facing said aperture having a recessed region bounded by a groove forming a resonant choke, a circuit coupling member extending through a further wall of said housing and insulated therefrom, a removable insert fitting the cavity in said housing and formed with an aperture therethrough registering with the aperture through the wall of said housing, a contact pin mounted in one wall of said insert and insulated therefrom, engaging the inner end of said circuit coupling member, and a contact wire mounted on said contact pin and extending across the aperture in said insert into contact with a crystal mounted in the opposite wall of said insert.

3. Mounting as claimed in claim 2 wherein the crystal holder mounted in said insert is electrically insulated from said insert and is connected to a contact pin, and wherein said insert is retained in position by means of a plug engaging said pin, said plug providing an electrical short circuit between said pin and the housing suitably placed to constitute an effective short circuit (at the operative wavelength) between said contact pin and said housing at the surface of the waveguide aperture through said insert.

4. Mounting as claimed in claim 3, in which said insert is reversed in position with respect to said housing.

5. Waveguide crystal rectifier comprising a unitary metallic housing, a waveguide connected to said housing in power feeding relation to a wall aperture in one wall of said housing, a metallic block insert snugly fitting within said housing and in metallic contact therewith insertable through an open end of said housing, said metallic block having an aperture aligned with the wall aperture in the housing wall, a first contact member insulatedly supported in the end wall of said housing opposite said open end, a second contact member insulatedly supported in said metallic block engaging said first contact member, and extending through said block into said aperture, a rectifier crystal mounted in said metallic block and exposed to said aperture, a contact wire extending from said second contact member across said aperture into contact with said rectifier crystal, means on said housing for receiving a coaxial connector to provide connection between an external circuit and the housing and between said external circuit and said first contact member, and means for retaining said metallic block in position within said housing, the internal surface of the apertured wall of said housing being provided with a recessed area surrounding said wall aperture and with a groove surrounding said recessed area and the surface of the opposite wall being similarly recessed and grooved, whereby low impedance is presented to the transfer of UHF energy between said waveguide and the aperture in said block and between the aperture in said block and the short-circuit represented by the metallic wall of said housing opposite said wall aperture.

References Cited in the file of this patent

UNITED STATES PATENTS

| Number | Name | Date |
|---|---|---|
| 1,622,459 | Lundquist | Mar. 29, 1927 |
| 2,427,087 | Carlson | Sept. 9, 1947 |
| 2,525,468 | Alpert | Oct. 10, 1950 |
| 2,563,613 | Ohl | Aug. 7, 1951 |

FOREIGN PATENTS

| Number | Country | Date |
|---|---|---|
| 572,138 | Great Britain | Sept. 25, 1945 |